June 25, 1963  C. S. STEINER ETAL  3,095,120
PUMPING SYSTEM FOR MEAT EMULSIONS
Filed Nov. 12, 1959  2 Sheets-Sheet 1
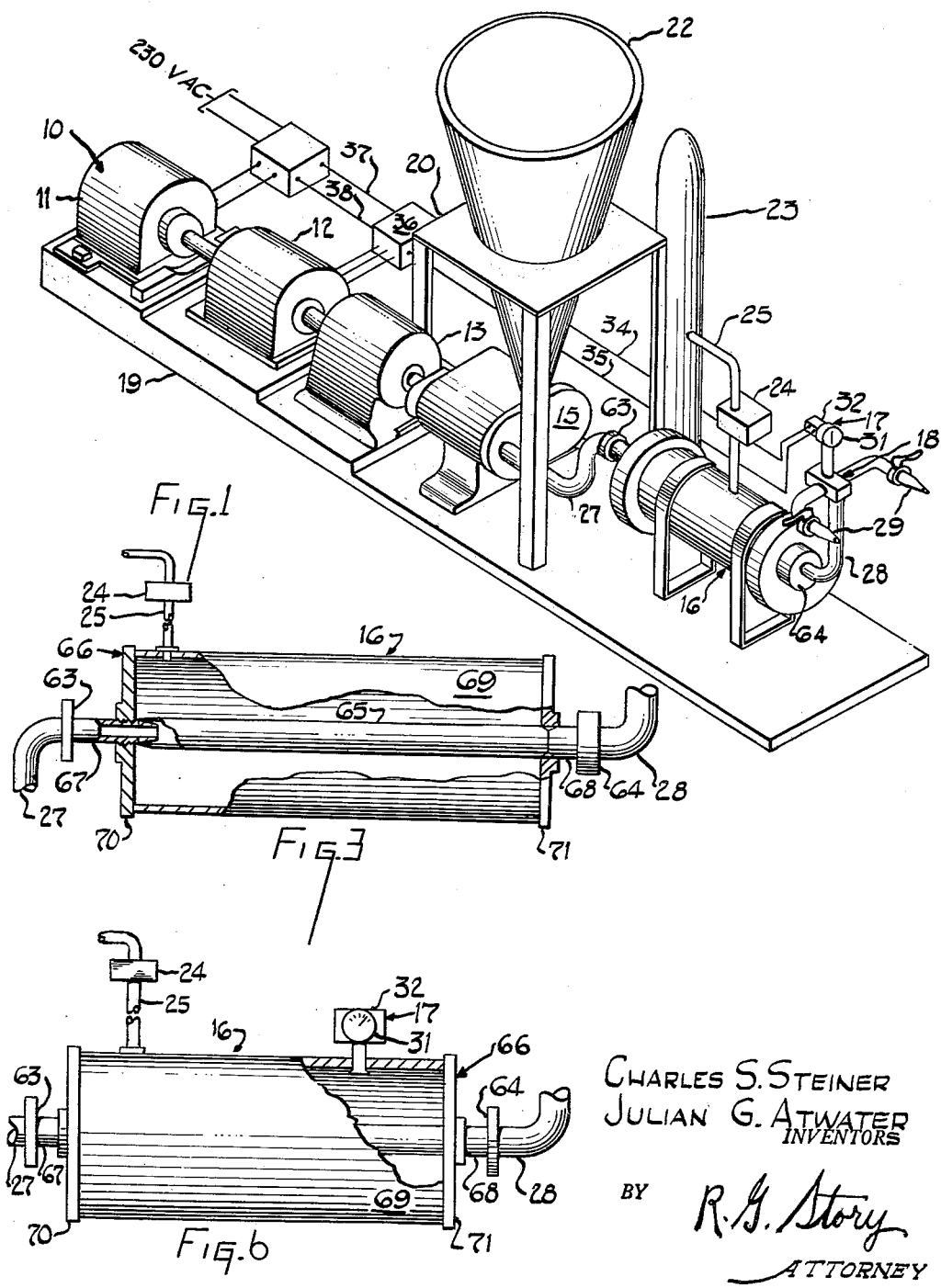
CHARLES S. STEINER
JULIAN G. ATWATER
INVENTORS
BY R. G. Story
ATTORNEY

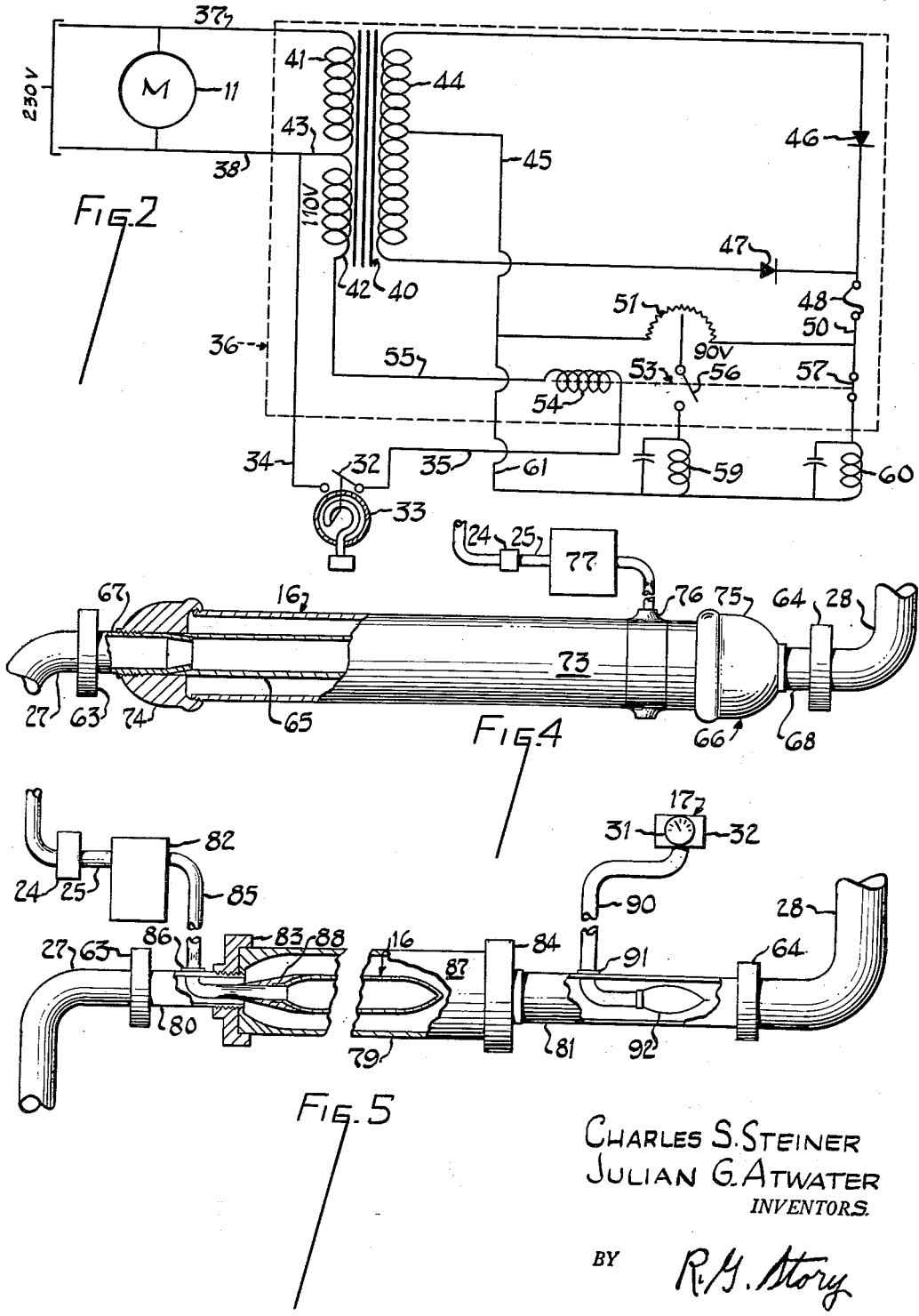

United States Patent Office 3,095,120
Patented June 25, 1963

3,095,120
PUMPING SYSTEM FOR MEAT EMULSIONS
Charles S. Steiner, Homewood, and Julian G. Atwater, Chicago Heights, Ill., assignors to Swift & Company, Chicago, Ill., a corporation of Illinois
Filed Nov. 12, 1959, Ser. No. 852,386
12 Claims. (Cl. 222—1)

This invention relates to an improved system for pumping emulsions and, more specifically, involves an improved method and apparatus for pumping comminuted foods and/or food emulsions at relatively high pressure to a filling device.

The improved system for pumping emulsions has broad application, but certain of the advantages thereof are more fully realized when handling comminuted meats, comminuted meat mixes, or meat emulsions, hereinafter referred to generally as "emulsion." Accordingly, the invention will be described in connection with the packing industry and specifically illustrated as applied to a system for stuffing sausage and frankfurter casings or molds, or the like, with emulsion.

All meat emulsions are relatively incompressible and very viscous so that any inordinate constriction in an emulsion delivery pipeline, such as may occur with large meat particles or changes in consistencies, will immediately result in dangerously high pressures therein, particularly where the emulsion is pumped by a machine of the positive displacement type. Closing off the pipe, as with a valve or plug, will naturally create an immediate rise in emulsion pressure. Furthermore, operation of the pumping equipment itself commonly produces pressure pulses in the emulsion. Such increases in pressure not only involve the possibility of damage to the pump and piping but also cause variations in pressures at the filling device. High pressures created by blockage, such as constrictions and closing of the pipe, result in a surge of emulsion at the filling device when such blockage is removed. Pulses from the equipment also cause annoying surges at the filling device. Nonuniform filling is the result.

In the past many food emulsions, particularly meat emulsions, have been forced at high pressures in the order of 75 p.s.i.g. into casings or containers through stuffing horns or high-speed filling machines. In filling casings it has been the usual practice to force meat emulsion from large-volume stuffers under pressure through the stuffing horn into a shirred casing which is manually played out from the stuffing horn by an operator. In this practice the pressure of the emulsion within the casing is controlled by the rate at which the operator plays out the casing from the stuffing horn. Obviously it has required great skill and practice for an operator to evenly fill a casing throughout its length. In frankfurter manufacture, for instance, the casings may range from 40 to 80 feet in length and must be tied off in equal lengths after filling. Variations in emulsion pressure at the stuffing horn result in variations of weight between segments of the casing and, therefore, between the finished sausages or frankfurters in any one batch. Obviously the operator will have no control whatsoever over variations in pressure which result from inconsistency of the emulsion or irregularities in the operation of pumping equipment.

The latter disadvantages also occur in can filling apparatus; that is, pressure changes due to variations in consistency of the emulsion or operation of the filling equipment will result in variations in density of the emulsion placed in successive cans. Can filling equipment usually includes a plurality of filling heads, each having intermittently operating means controlling the flow of emulsion to the can. Consequently the intermittent operation of the heads will cause pulsing pressure in the emulsion supply line. This problem is especially aggravated where rapidly operating positive displacement-type pumping apparatus is employed. The nature of such apparatus in itself tends to produce pressure pulses; and when coupled to intermittently operating filling equipment the components must be carefully synchronized if noticeable raising or dropping pressure pulses are to be avoided. Relief valve systems are inapplicable to alleviate the condition because such systems cause damage to food emulsions (through frictional heating and breaking) and create unsanitary conditions.

Consequently prior to this invention we believe that a system for controlled pumping of meat emulsion by the continuous in-line principle without by-passing was unknown. Earlier devices have generally depended upon more or less batch operation principles; that is, a large quantity of emulsion is first placed in a stuffer which is then gradually emptied into the casings or cans until the stuffer itself is completely empty. The stuffer would then be refilled from an accumulated supply. The refilling operation demanded considerable time and labor and kept the equipment nonproductive for a substantial period. Obviously this also resulted in large quantities of food emulsions being held relatively stagnant for considerable periods of time either in supply vessels or in the stuffers themselves. Unsanitary conditions often were created with consequent bacterial growth and spoilage a constant problem.

Therefore, it is an important object of this invention to provide an improved system of essentially continuous flow-type operation which provides for quickly and continuously moving food emulsion from the production stage into casings or containers or the like.

A further object of this invention is to provide an improved method and apparatus for continuously pumping food emulsions at substantially constant pressure to the filling apparatus.

Another object of this invention is to provide an improved apparatus for dampening and substantially eliminating pressure surges, however caused, in food emulsion supply lines.

A still further object of this invention is to provide an improved system for pumping meat emulsion in response to the pressure on said emulsion in a filling apparatus.

Yet another object of this invention is to provide an improved continuous method and apparatus for supplying meat emulsion in a stuffing operation, thereby eliminating nonproductive shutdown periods for refilling of the equipment.

Fundamentally the method involves pumping emulsion through a conduit at a given rate and within a selected pressure range. As pressure in the system builds up within the selected range, a portion of the conduit is increased in volume to both store emulsion in excess of the immediate demand and to dampen the increase in pressure. The pressure is measured and, upon reaching the upper limit of the selected range, pumping is terminated. After pumping is terminated, the volume of the portion of the conduit is reduced, forcing emulsion therefrom to meet the immediate demand for flow and maintain pressure within the selected range until pumping is recommenced.

The apparatus basically includes emulsion pumping means having driving means disconnectably coupled thereto for operation in accordance with pressures within the system. A conduit leading from the pump to a filling means for delivering emulsion thereto contains an elastic member, responsive to the emulsion pressure, for varying the volume of a portion of the conduit and dampening pressure pulses in the system. A pressure sensing means is associated with the conduit for measuring the emulsion pressure therein and signals the disconnection and/or connection of the driving and pumping means.

Additional objects and advantages of the invention will become apparent from the following description taken in conjunction with the drawings, in which:

FIGURE 1 is a perspective view of the apparatus of this invention;

FIGURE 2 is a simplified wiring diagram for the apparatus of FIGURE 1;

FIGURE 3 is a partial sectional view of the apparatus of FIGURE 1 showing the elastic member;

FIGURE 4 is a partial sectional view of the apparatus of FIGURE 1 showing an alternative embodiment of the elastic member;

FIGURE 5 is a partial sectional view of the apparatus of FIGURE 1 showing a second alternative embodiment of the elastic member and an alternative embodiment of the pressure sensing element; and FIGURE 6 is a partial sectional view of the apparatus of FIGURE 1 showing an alternative mounting of the pressure sensing means.

The method involves pumping the emulsion at a given rate, equal to or greater than the demand, through a conduit to a filling means. The pressure of the emulsion in the conduit is measured and the pumping controlled therefrom. A certain pressure on the emulsion will be desired according to the type of filling performed. Normally a range of pressure a few pounds per square inch to either side of the desired figure will be acceptable. As pressure builds up, due to the filling operations or change in the consistency of the meat emulsion to the upper limit of the acceptable range, the pumping of the emulsion is stopped. Simultaneously as pressure builds up, before pumping is terminated, the volume of the conduit is increased, preferably by symmetrically enlarging the cross section exposed to flow, to absorb part of the flow of emulsion from the pump and thereby both slowing the increasing pressure and storing a quantity of emulsion to be deliverable to the filling means when pumping has ceased. Once pumping is stopped the initial demand for additional emulsion at the filling means will be met with the quantity of stored emulsion by decreasing the volume of the conduit (again preferably through adjusting the cross section to decrease the area of flow). As the stored quantity becomes exhausted, the pressure within the conduit will drop to the lower limit of the acceptable range; and in response to such a drop the pumping is recommenced. Thereafter the operations may be repeated. In all active conditions of the apparatus, streamline flow throughout the conduit is maintained, whereby all material will flow in and then directly through and out of the conduit; thus, no meat emulsion, or other perishable fluid, will be trapped in a pocket to stagnate or spoil.

Referring to FIGURE 1, the major components of an apparatus for performing the method are shown, namely: a drive means generally 10 including an electric motor 11, an electrically operated clutch device 12 and a speed reducer 13, connected to a positive displacement pump generally 15 which forces emulsion through an elastic member generally 16 past a pressure-sensitive means 17, for controlling the drive means 10, to a filling means generally 18. The various component parts are supported on a bed generally 19. A stand generally 20 supports a hopper funnel 22 for feeding emulsion to the pump 15. A source of gas under relatively high pressure, such as gas cylinder 23, is connected through a pressure regulator valve 24 by suitable tubing 25 to the elastic member generally 16.

All of the preceding component parts, with the exception of the elastic member 16, are substantially standard pieces of equipment separately available on the commercial market. The elastic member 16, however, is a novel device especially devised for use with the other components in a meat emulsion distributing unit. The pump 15, preferably of the lobe type, is selected by its rated capacity according to the anticipated cumulative demand at the filling means 18 and considering the factors of emulsion particle size and viscosity which often require oversize equipment. In turn, the operating speed of the pump, at capacity, dictates the characteristics of speed reducer 13 and the electric motor 11. The overall system should deliver emulsion at or in excess of the maximum demand rate.

FIGURES 3 through 5 illustrate the various embodiments of the elastic member generally 16 which may be used for this purpose. In all embodiments a pipe 27 is connected between the discharge side of pump 15 and the elastic member 16; and a distribution manifold 28 extends from the elastic member to the filling means generally 18, such as stuffing horns 29 illustrated in FIGURE 1. Normally the pressure-sensitive means generally 17 is located in the distribution manifold 28; however, it may be located elsewhere as will be explained for the embodiments illustrated in FIGURES 5 and 6. The pressure-sensitive means 17 is responsive to changes in pressure of the emulsion in the system. Preferably the sensing means 17 includes both a visually readable gauge 31 and a pressure-responsive electric switch 32 set to open and close when the pressure within manifold 28 increases or decreases about a given pressure.

As shown in FIGURE 2, the switch 32 is mechanically linked with a pressure-actuated member such as a Bourdon tube 33 which in turn is in communication with the interior of distribution manifold 28 and tends to straighten out as the emulsion pressure increases. Wires 34 and 35 connect the switch 32 electrically with a drive controller generally 36. The drive controller 36 is also connected to a source of electric power by wires 37 and 38. Motor 11 is also connected to the same source (in this instance a 230 v. A.C. supply) parallel to the controller 36. As will become clear, controller generally 36 is connected to the clutch 12 thereby regulating the operation of pump 15 in accordance with the actuation of switch 32.

Internal elements of the controller 36 comprise a transformer generally 40 having a primary coil 41 connected across wires 37, 38. The transformer also includes an autotransformer coil 42 having a common terminal 43 with the primary coil 41; and a secondary winding 44 having a center tap 45. The end terminals of winding 44 are connected through a pair of rectifiers 46, 47 to provide direct current with respect to the center tap 45. A fuse 48 is connected between both rectifiers 46, 47 and a wire 50. A variable potentiometer 51 is connected across wire 50 and the center tap 45 (from secondary winding 44).

Also, within the controller 36 is a 2-switch relay generally 53. One end of a coil 54 in the relay is connected to the autotransformer coil 42 by wire 55. The other end of relay coil 54 is connected to the wire 35 running outside the controller 36 to the switch 32. Wire 34 also extending from the switch 32 is connected to the common terminal 43 between primary coil 41 and autotransformer 42.

As noted, the relay 53 actuates two switches 56 and 57. Switch 56 is connected to the potentiometer 51 and is normally open (when relay 53 is not energized). The other side of switch 56 is connected to an actuator mechanism generally 59 (usually an electromagnet) for clutch 12. Switch 57 is normally closed and is connected between wire 50 and a brake mechanism generally 60 (usually a solenoid for tightening a brake band in the clutch device 12). Both the actuator mechanism and the brake mechanism are connected by wire 61, in parallel, to the center tap 45 extending from the secondary winding 44. In many installations the brake mechanism 60 (and switch 57) may be omitted, particularly where pumping heavy emulsions which quickly stop the pump.

It will be apparent that when switch 32 is closed (by reducing the pressure acting on the Bourdon tube 33 thus causing it to curl) relay 53 will be energized to close switch 56 and apply power to clutch 12, while simultaneously opening switch 57 thus releasing the brake mechanism 60 permitting operation of pump 15. When switch 32 is in the normally open position (where high pressure causes the Bourdon tube to straighten) the action of relay 53 will be reversed, as shown in FIGURE 2, causing the clutch 12 to be deenergized and the brake mechanism to be applied to stop pump 15.

Referring to FIGURE 1, the elastic member generally 16 is connected to the pipe 27 and manifold 28 by a pair of sanitary couplings 63, 64, respectively. This type of construction provides for a smooth continuous internal surface of the emulsion conduits between the pump 15 and the stuffing horns 29. Thus there are no internal grooves or pockets wherein emulsion could be trapped and spoiled. Furthermore, the sanitary couplings 63, 64 permit the entire elastic member to be removed from the system for flushing and cleaning.

The embodiments of the apparatus illustrated in FIGURES 3 and 4 include an elastic member generally 16 comprising a length of strong flexible tube 65 preferably manufactured from a plasticized polyvinyl chloride, or the like (such as the material commercially available under the name of "Tygon" and produced by U.S. Stoneware Company), within a rigid chamber generally 66 having end pipes 67, 68. The latter pipes connect the ends of tube 65 to pipe 27 and manifold 28, respectively. In the embodiment illustrated in FIGURE 3, the rigid chamber is in the form of a relatively large volume, fluid-tight drum 69. A pair of end flanges 70, 71 holds the drum 69 concentric to the end pipes and also holds the end of flexible tube 65 securely on the latter. The space within drum 69 is coupled directly to the high-pressure gas cylinder 23 through the pressure regulator valve 24 by tubing 25.

It will be apparent that as pressure surges are developed in the system, due to variations in the operating conditions at the filling means 18, the pressure of the emulsion in the flexible tube 65 will work against the gas pressure within drum 69 and the wall of tube 65. Thus the flexible tube 65 of the elastic member 16 tends to absorb increases in pressure by expansion. This expansion will compress the gas in drum 69 and increase its pressure. A relatively large volume of gas within the drum will allow a substantial expansion of the tube 65 while avoiding too rapid a build-up of pressure in the system, thus allowing ample time for the pressure-responsive switch 32 to be opened. As is apparent in FIGURE 2, when switch 32 is opened the controller 36 will cause the clutch actuator mechanism 59 to be deenergized and the brake mechanism 60 to be actuated thereby disconnecting and stopping pump 15. Obviously, when the pump is disconnected from motor 11, pressure build-up within the system will cease. Immediately following this sequence of events any new demand for emulsion at the filling means 18 will be supplied from the material temporarily stored in the expanded flexible tube 65. Emulsion will be forced therefrom by the compressed gas in drum 69. Supply of emulsion will continue in this manner until the pressure in the system drops sufficiently for the pressure-responsive switch 32 to reclose, thus causing the controller 36 to energize the clutch actuator 59 and release the brake mechanism 60 to reconnect the electric motor and pump 15.

In FIGURE 4 the chamber generally 66 comprises a relatively small diameter steel cylinder 73 held concentrically about the flexible tube 65 by a pair of end reducers 74, 75 threadedly fastened to end pipes 67, 68, respectively, and securing the flexible tube 65 thereto. A T connector 76 encircles cylinder 73 and connects the space therein with a vessel 77 of substantial capacity. The vessel 77, in turn, is connected by tubing 25 through pressure regulator valve 24 to gas cylinder 23. In this embodiment, emulsion pressure within the flexible tube 65 works to compress gas within both the cylinder 73 and vessel 77. The advantage of such a system resides in a low space requirement along the path of emulsion conduit, as vessel 77 may be remotely located.

A third embodiment of the elastic member generally 16 is illustrated in FIGURE 5. In this embodiment, the flexible conduit 65 and the rigid chamber generally 66 are eliminated and replaced by an enlarged rigid conduit 79 several feet in length. The enlarged conduit is secured to a pair of end pipes 80, 81 by a pair of flanges 83, 84, respectively, so that emulsion will flow directly therethrough. The internal surface of the enlarged conduit is tapered at both ends to form a smooth connection with the end pipes 80, 81. In this instance tubing 25 (connected through regulator valve 24 to a high-pressure gas cylinder 23) leads into a vessel 82 which, in turn, is connected with the interior of the enlarged conduit 79 by a tube 85. The latter enters the emulsion system through a fitting 86 on end pipe 80 and extends longitudinally into the enlarged conduit 79. An elongated bladder 87 manufactured from a suitable flexible material such as a plasticized polyvinyl chloride, or the like, is attached to the end of tube 85 by a streamlined adapter 88. The bladder 87 forms the elastic member generally 16. It is inflated at normal pressure to extend substantially concentrically the length of the interior of enlarged conduit 79, leaving an annular passageway having a flow cross section about equal to that of pipe 80. Obviously increased emulsion pressures will compress the bladder 87 and the gas therein and in vessel 82. An increased variable quantity of emulsion may thus be stored at pressure within the enlarged conduit 79 and forced therefrom by the bladder 87 as needed.

FIGURE 5 also illustrates an alternate embodiment of the pressure-sensing means generally 17. In this instance the visual gauge 31 and the pressure-responsive switch 32 are connected to a rigid tube 90 leading to the interior of end pipe 81. Tube 90 enters the end pipe through a fitting 91 and connects with a resilient hollow bulb 92. The bulb and tube 90 are filled with fluid such as mineral oil or water which transmits the pressure exerted on the bulb 92 by emulsion within the system to the pressure-sensing means 17.

Still another embodiment of the pressure-sensing means generally 17 is illustrated in FIGURE 6. In this embodiment the apparatus is substantially that shown in FIGURE 3. However, the pressure-sensing means 17, comprising the visual gauge 31 and pressure-responsive switch 32, is connected directly to the gas chamber within drum 69 rather than to the emulsion in the distribution manifold 28. Thus the pressure-sensing means senses and responds to changes in volume of the flexible conduit 65 in that expansion and contraction of the latter through a given range will cause responsive changes in the pressure of gas within the drum. Accordingly the device is set to respond to changes in the gas pressure brought about by volume changes in the conduit 65 due to variations in emulsion pressures.

Operation of the pumping system will now have become obvious. Gas is introduced into the chamber 66 surrounding the flexible emulsion conduit (or to the bladder 87) to a pressure approximating the desired emulsion pressure (approximately 75 p.s.i.g. in this instance). Regulator valve 24 prevents the system from going below that pressure by permitting make-up gas to be introduced from the high pressure source. Meat emulsion is delivered to the hopper funnel 22 in any suitable manner either continuously directly from comminuting apparatus or added at intervals. The motor 11 is then started and the emulsion system primed. That is, emulsion is pumped through the system until it is full and air is removed (used emulsion may be returned directly to the hopper 22). The apparatus is then ready to deliver emulsion for filling operations.

As the demand for emulsion at the stuffing horns 29 changes from time to time, pressures within the system will change. While the pump 15 operates continuously, pressures will increase when the demand for emulsion is decreased. As pressures increase, switch 32 is opened and the clutch controller 36 is caused to disconnect the motor 11 from pump 15 by deenergizing the clutch 12. At the same time increases in pressures in the distribution manifold 28 will cause a change in dimension of the elastic member 16 (either expansion of the flexible tube 65 or compression of the bladder 87), thus increasing the volume of emulsion therein. Consequently, when the demand for emulsion next increases at stuffing horns 29, the immediate need will be supplied by decreasing the volume held in the elastic member generally 16 until the pressure in the emulsion system drops below the allowable range. The clutch controller generally 36 will then cause the clutch 12 to reconnect the electric motor 11 and pump 15 to commence pumping of emulsion from hopper funnel 22 to the stuffing horns 29. Such operation will provide a continuous, substantially constant pressure supply of emulsion upon demand at the filling means 18.

Obviously many modifications and variations of the invention as hereinbefore set forth may be made without departing from the spirit and scope thereof and, therefore, only such limitations should be imposed as are indicated in the appended claims.

We claim:

1. A method of compensating for variations in demand for flow of a food emulsion, said method comprising: pumping said emulsion through a passageway which at all times conforms to streamline flow therethrough at a rate of flow at least equal to the maximum expected demand for said emulsion; measuring the pressure of said emulsion in said passageway; expanding said passageway as demand falls below said maximum demand and while the pressure of said emulsion increases through a given pressure range, thereby dampening the rate of increase of said pressure and storing a quantity of said emulsion within said passageway; terminating the pumping of said emulsion upon the pressure in said passageway exceeding said given range; supplying demand for said emulsion immediately subsequent to said termination from said quantity stored within said passageway so long as the pressure therein remains within said given range; and recommencing pumping said emulsion upon the pressure within said passageway decreasing below said given range.

2. A method for compensating for variations in demand for flow of a food emulsion, said method comprising: pumping said emulsion with a positive displacement type pump through a given passageway which at all time conforms to streamline flow therethrough at a given rate of flow; measuring the pressure of said emulsion in said passageway; terminating the pumping of said emulsion when said pressure exceeds a given range; simultaneously increasing the cross-sectional area of a portion of said passage as pressure of the emulsion increases, thus increasing volume of said passage and tending to keep the pressure within said given range; thereafter decreasing the volume of said passage by reducing the cross-sectional area of said portion to maintain the flow in accordance with decreasing pressure after pumping of the emulsion has been terminated, thus further tending to keep the pressure within said given range; and recommencing pumping of said emulsion as said pressure reaches the lower limit of said given range.

3. In a food emulsion pumping system including means for pumping emulsion through a conduit having a surface which conforms to streamline flow of the emulsion to a filling means, the improvement in said conduit consisting of: a rigid housing extending along a length of said conduit, said housing enveloping said conduit with a substantial volume of gas at a given pressure; a flexible section of conduit having a surface which conforms to streamline flow of the emulsion in all conditions of expansion and contraction within said housing, said flexible section being expansible outwardly toward said housing against the pressure of said gas upon an increase in the pressure of emulsion within said conduit so as to temporarily store emulsion therein in excess of the demand at said filling means; said flexible section also being compressible inwardly away from said housing by said gas upon a decrease in the pressure of the emulsion within said conduit.

4. In a food emulsion pumping system including means for pumping emulsion to a filling means, the improvement in said system comprising: a conduit having a surface which conforms to streamline flow of the emulsion extending between the pumping means and the filling means; a flexible walled section of said conduit having a surface which conforms to streamline flow of the emulsion in all conditions of expansion and contraction, said section permitting the total volume of emulsion in movement through said section at a given moment to vary above the normal capacity of said conduit in proportion to the pressure of said emulsion; a rigid housing secured to said conduit and enveloping the flexible section of conduit; and a large volume of gas normally at a given pressure in communication with the interior of said housing whereby increases in the pressure of the emulsion within said conduit will cause expansion of said flexible section against said gas.

5. In a food emulsion pumping system including means for pumping emulsion to a filling means, the improvement in said system comprising: a conduit having a surface which conforms to streamline flow of the emulsion extending between the pumping means and the filling means, said conduit having a portion of expanded cross sections; a compressible bladder having a surface which conforms to streamline flow of the emulsion in all conditions of expansion and contraction spaced within said expanded portion of said conduit; and a substantial volume of gas normally at a given pressure in communication with the interior of said bladder whereby variations in the pressure of the emulsion within said conduit will cause compression of said bladder against said gas.

6. A method for compensating for variations in demand for flow of a food emulsion, said method comprising: pumping emulsion at a given pressure range through a passageway which at all times conforms to streamline flow therethrough and has a symmetrically expansible section enclosed within a rigid chamber; maintaining a large volume of gas at about said pressure range in communication with said chamber exterior of said section of said passageway; symmetrically expanding said section as demand for emulsion decreases and the pressure of said emulsion begins to increase so as to temporarily store an excess of emulsion and maintain said pressure within said given range; terminating the pumping of said emulsion upon said pressure exceeding said given range; temporarily supplying demand for said emulsion by symmetrically compressing the expanded section of said passageway while pumping is terminated; and recommencing pumping of said emulsion when said pressure falls within said given range.

7. A method of compensating for variations in demand for flow of a food emulsion, said method comprising: pumping said emulsion through a passageway which at all times conforms to streamline flow therethrough at a rate of flow at least equal to the maximum expected demand for said emulsion; expanding said pasasgeway when demand falls below said maximum demand and when the pressure of the emulsion increases thereby dampening the rate of increase of said pressure and storing a quantity of said emulsion within said passageway; terminating the pumping of said emulsion upon the expansion of said passageway reaching a given range; supplying demand for said emulsion immediately subsequent to said termination from said quantity stored within said passageway; and recommencing pumping said emulsion upon the expansion of said passageway decreasing below said given range.

8. An improved food emulsion pumping system comprising: a conduit having a surface which conforms to streamline flow of the emulsion; filling means at one end of the conduit; a positive displacement pump connected to the opposite end of said conduit for forcing emulsion under pressure to said filling means; an elastic member having a surface which conforms to streamline flow of the emulsion in all conditions of expansion and contraction associated with a portion of said conduit whereby the volume of said portion may be changed above the normal capacity of said conduit in accordance with the pressure of the emulsion therein to dampen pressure fluctuations and provide a variable increased capacity for emulsion in said conduit when the demand for emulsion is temporarily decreased at said filling means; drive means associated with said pump; volume responsive means associated with said elastic member; sensing means in communication with said volume responsive means for detecting and signalling changes in the volume of said elastic member; and control means connected between said sensing means and said drive means to stop said pump when the volume of said elastic member exceeds a given range and to start said pump when said volume drops below said given range.

9. An improved food emulsion pumping system comprising: a conduit having a surface which conforms to streamline flow of the emulsion; filling means at one end of said conduit; a positive displacement pump connected to the opposite end of said conduit for forcing emulsion under pressure to said filling means; an elastic member having a surface which conforms to streamline flow of the emulsion in all conditions of expansion and contraction said elastic member being associated with a portion of said conduit whereby the volume of said portion may be changed above the normal capacity of said conduit in accordance with the pressure of the emulsion therein to dampen pressure fluctuations and provide a variable increased capacity for emulsion in said conduit; drive means associated with said pump; pressure-sensing means for detecting and signalling changes in the pressure of emulsion within said conduit; and control means connected between said pressure-sensing means and said drive means to stop said pump when the pressure in said conduit exceeds a given range and to start said pump when said pressure drops below said given range.

10. An improved food emulsion pumping system comprising: a conduit having a surface which conforms to streamline flow of the emulsion; filling means at one end of said conduit; a positive displacement pump connected to the opposite end of said conduit for forcing emulsion under pressure to said filling means; an elastic member having a surface which conforms to streamline flow of the emulsion in all conditions of expansion and contraction, said elastic member associated with a portion of said conduit whereby the volume of said portion may be changed above the normal capacity of said conduit in accordance with the pressure of the emulsion therein to dampen pressure fluctuations and provide a variable increased capacity for emulsion in said conduit; drive means disconnectibly coupled to said pump; pressure-sensing means for detecting and signalling changes in the pressure of emulsion within said conduit; and control means connected between said pressure-sensing means and said drive means to cause said drive means to be disconnected from said pump when said pressure exceeds a given range and to cause said drive means and said pump to be connected when said pressure drops below said given range.

11. The combination of claim 10 wherein the elastic member comprises a section of flexible walled tubing in said conduit enveloped by a fixed volume of gas normally at a given pressure.

12. The combination of claim 10 wherein the elastic member comprises a section of said conduit having an expanded cross-section, and a compressible bladder interiorly of said section, said bladder being in communication with a fixed volume of gas normally at a given pressure.

References Cited in the file of this patent

UNITED STATES PATENTS

| | | |
|---|---|---|
| 2,028,266 | Anderson | Jan. 21, 1936 |
| 2,149,127 | Tear | Feb. 28, 1939 |
| 2,194,948 | Lenzke | Mar. 26, 1940 |
| 2,533,428 | Carpenter | Dec. 12, 1950 |
| 2,735,642 | Norman | Feb. 21, 1956 |
| 2,760,518 | Peet | Aug. 28, 1956 |
| 2,838,073 | Di Mattia et al. | June 10, 1958 |
| 3,013,696 | Tralmer | Dec. 19, 1961 |